(12) United States Patent
Cowelchuk et al.

(10) Patent No.: US 7,806,430 B2
(45) Date of Patent: *Oct. 5, 2010

(54) AIRBAG ASSEMBLY

(75) Inventors: Glenn A. Cowelchuk, Chesterfield Township, MI (US); Todd L. DePue, Brighton, MI (US); Robert J. Adams, Ypsilanti, MI (US); Michael W. Cass, Lenox, MI (US); Paul W. Nagy, Macomb, MI (US); Sarkis B. Mikhjian, Rochester Hills, MI (US)

(73) Assignee: International Automotive Components Group North America, Inc., Dearborn, MI (US)

( * ) Notice: Subject to any disclaimer, the term of this patent is extended or adjusted under 35 U.S.C. 154(b) by 828 days.

This patent is subject to a terminal disclaimer.

(21) Appl. No.: 11/457,253

(22) Filed: Jul. 13, 2006

(65) Prior Publication Data

US 2008/0012273 A1 Jan. 17, 2008

(51) Int. Cl.
*B60R 21/20* (2006.01)
(52) U.S. Cl. .................................. 280/728.3
(58) Field of Classification Search ............... 280/728.3
See application file for complete search history.

(56) References Cited

U.S. PATENT DOCUMENTS

| 5,769,451 | A | | 6/1998 | Inada et al. | |
|---|---|---|---|---|---|
| 6,109,645 | A | | 8/2000 | Totani et al. | |
| 6,161,865 | A | * | 12/2000 | Rose et al. | 280/728.3 |
| 6,237,936 | B1 | * | 5/2001 | Quade et al. | 280/730.2 |
| 6,378,894 | B1 | * | 4/2002 | Trevino et al. | 280/728.3 |
| 6,406,056 | B2 | | 6/2002 | Yokota | |
| 6,601,870 | B2 | * | 8/2003 | Suzuki et al. | 280/728.3 |
| 6,623,029 | B2 | * | 9/2003 | Sun et al. | 280/728.2 |
| 6,929,280 | B2 | * | 8/2005 | Yasuda et al. | 280/728.2 |
| 7,029,027 | B2 | * | 4/2006 | Gray et al. | 280/728.3 |
| 7,234,724 | B1 | * | 6/2007 | Cowelchuk et al. | 280/728.2 |
| 7,234,726 | B2 | * | 6/2007 | Trevino et al. | 280/728.3 |
| 7,290,790 | B2 | * | 11/2007 | Kielinen | 280/728.2 |
| 7,393,004 | B2 | * | 7/2008 | Ono et al. | 280/728.2 |
| 7,422,232 | B2 | * | 9/2008 | Cowelchuk et al. | 280/728.3 |
| 2002/0005630 | A1 | * | 1/2002 | Suzuki et al. | 280/728.3 |
| 2005/0087963 | A1 | * | 4/2005 | Dailey et al. | 280/728.3 |
| 2005/0127642 | A1 | * | 6/2005 | Weissert et al. | 280/728.3 |
| 2006/0022438 | A1 | * | 2/2006 | Beckley et al. | 280/728.3 |
| 2006/0131844 | A1 | * | 6/2006 | Trevino et al. | 280/728.3 |
| 2006/0290109 | A1 | * | 12/2006 | Kielinen | 280/728.2 |
| 2007/0007753 | A1 | * | 1/2007 | Williams et al. | 280/728.2 |
| 2007/0108739 | A1 | * | 5/2007 | Loew et al. | 280/728.2 |
| 2007/0187930 | A1 | * | 8/2007 | Chitteti et al. | 280/728.2 |
| 2007/0278773 | A1 | * | 12/2007 | Cowelchuck et al. | 280/732 |

* cited by examiner

*Primary Examiner*—Paul N. Dickson
*Assistant Examiner*—Barry Gooden, Jr.
(74) *Attorney, Agent, or Firm*—Brooks Kushman P.C.

(57) ABSTRACT

In at least one embodiment, the present invention relates an airbag assembly comprising a panel having a tear seam forming at least one airbag door, and a door chute assembly comprising a laterally extending flange connected to the panel proximate the airbag door. The door chute assembly includes a chute depending from the flange away from the panel and the chute has at least one opening. The airbag assembly further comprises a door panel assembly including at least one door panel disposed within the chute and connected to the airbag door. The door panel has a downwardly depending flange having at least one projection extending laterally through the at least one opening of the chute. The airbag assembly further comprises an inflatable airbag mounted on the door chute.

14 Claims, 4 Drawing Sheets

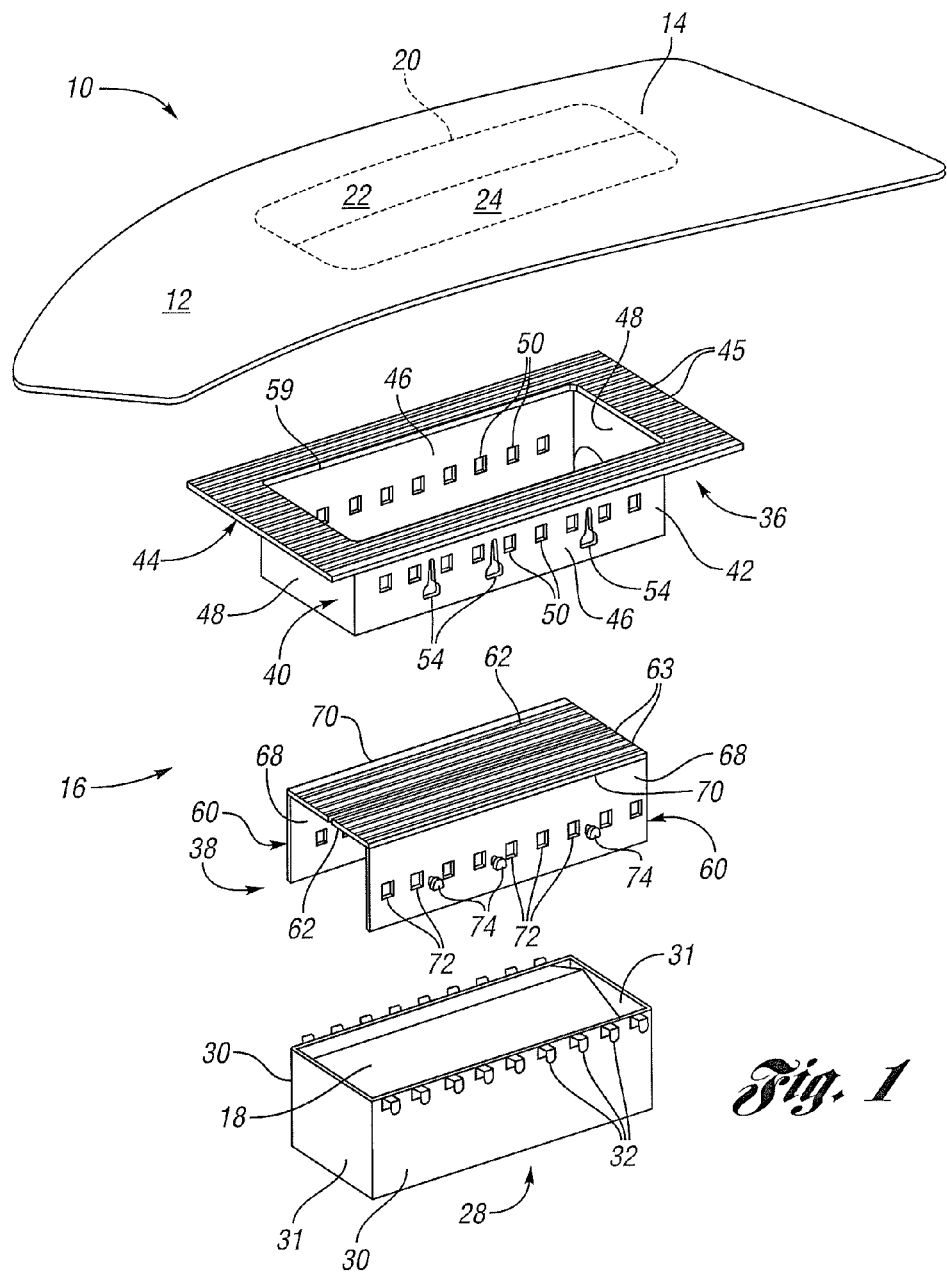
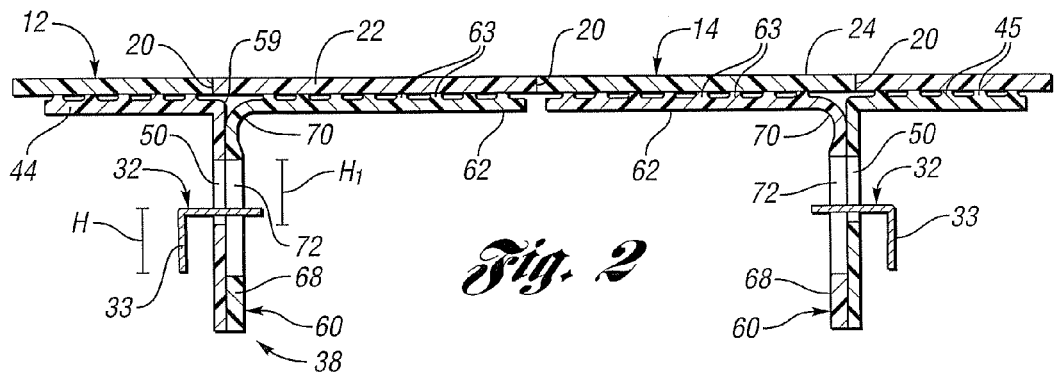
Fig. 1
Fig. 2

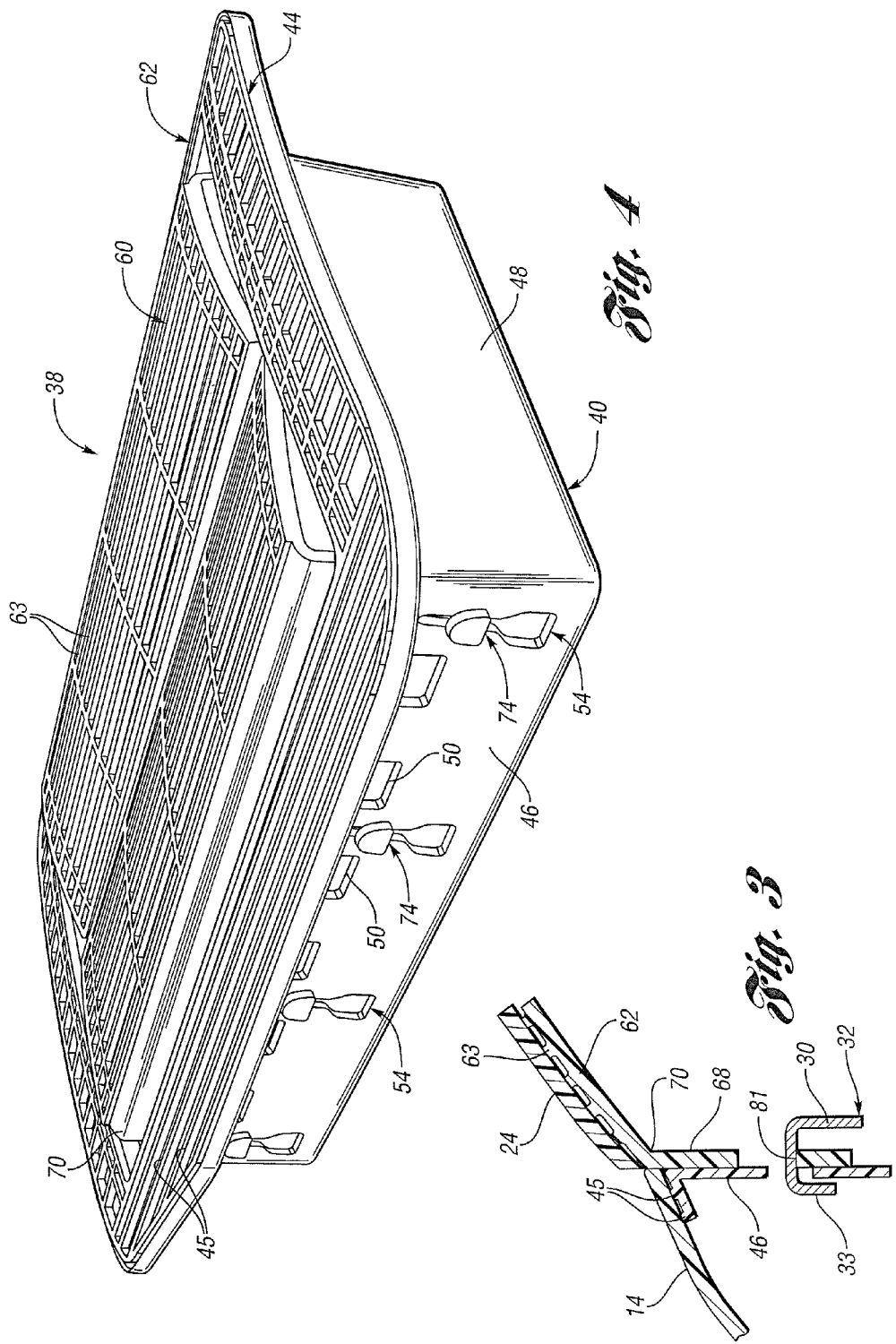

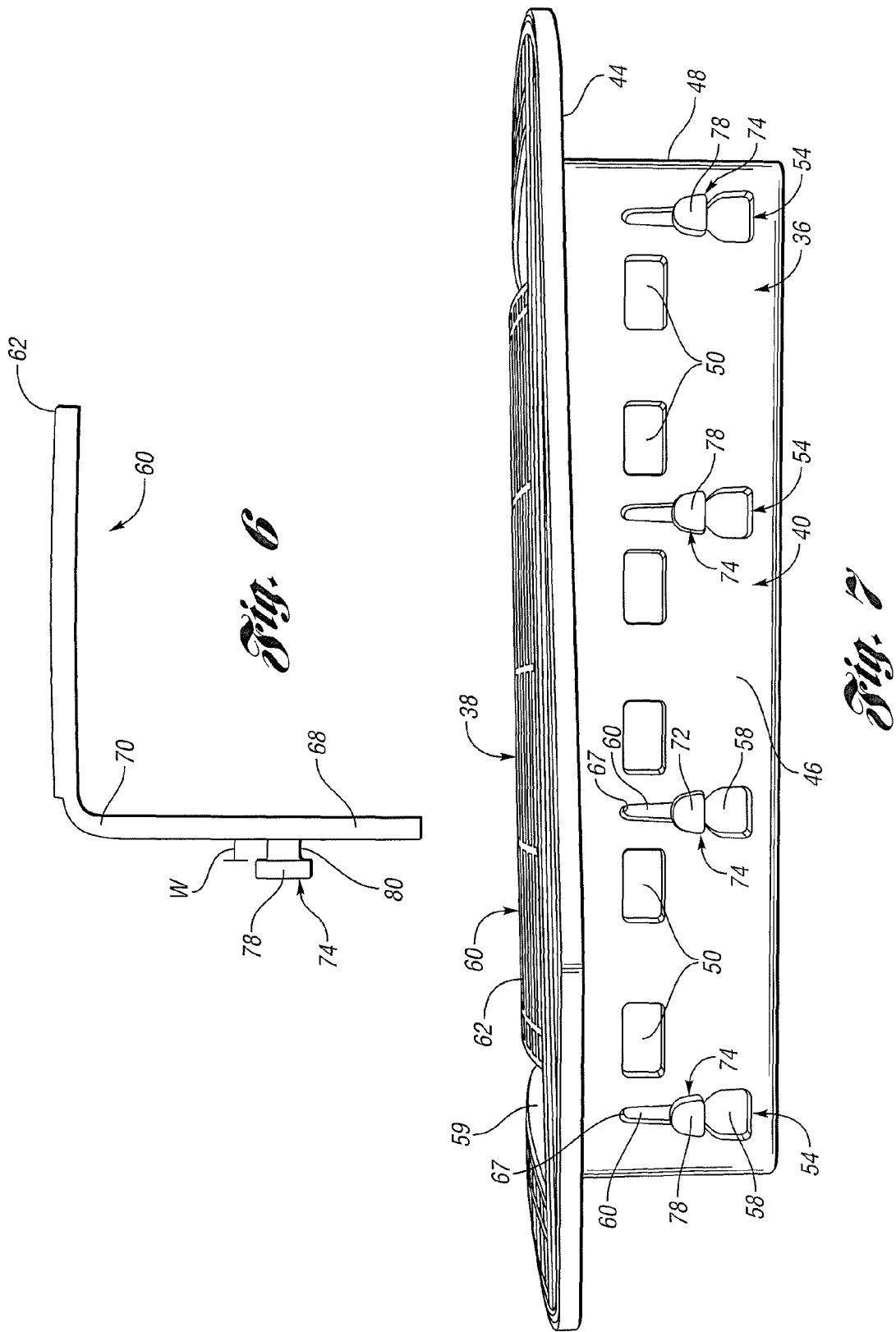

AIRBAG ASSEMBLY

BACKGROUND OF THE INVENTION

1. Field of the Invention

The present invention relates to an airbag assembly, and in particular to a door chute and panel assembly for use with an airbag assembly.

2. Background Art

Airbags are commonly used in motor vehicles, but may also be used in other types of modes of transportation such as trains and airplanes. Specifically, an airbag is stored in a folded condition in a stored receptacle and then rapidly inflates via an inflation fluid, as such with gas from a gas generator or other types of inflators, when an event indicative of a collision of the vehicle is detected by sensors. The airbag then deploys into a position to absorb the impact of the driver or passenger.

Prior airbag assemblies and manufacturing methods are disclosed in U.S. Pat. Nos. 5,769,451; 6,109,645; 6,406,056; and 6,929,280.

SUMMARY OF THE INVENTION

Under the invention, an airbag assembly is provided. In at least one embodiment, the airbag assembly comprises a panel having a tear seam forming at least one airbag door, and a door chute assembly comprising a laterally extending flange connected to the panel proximate the airbag door. The door chute assembly includes a chute depending from the flange away from the panel and having at least one opening. The airbag assembly further comprises a door panel assembly including at least one door panel disposed within the chute and connected to the airbag door. The door panel has a downwardly depending flange having at least one projection extending laterally through the at least one opening of the chute. The airbag assembly further comprises an inflatable airbag mounted on the door chute.

Under the invention, a door chute and panel assembly is also provided. In at least one embodiment, the door chute and panel assembly comprises a door chute assembly comprising a laterally extending flange connectable to a panel proximate an airbag door. The door chute assembly further includes a chute depending from the flange and having at least one opening. The door chute and panel assembly further include a door panel assembly including at least one door panel disposed within the chute and connectable to the airbag door. The door panel has a downwardly depending flange having at least one projection extending laterally through the at least one opening of the chute.

Under the invention, a method for manufacturing an airbag assembly is also provided. In at least one embodiment, the method for manufacturing an airbag assembly comprises providing a panel having a tear seam forming at least one airbag door, providing a door chute assembly comprising a chute having a laterally extending flange, and connecting the flange of the door chute assembly to the panel proximate the airbag door. The chute has at least one opening. The method further comprises disposing a door panel assembly including at least one door panel within the chute and connecting the door panel to the airbag door. The door panel has a downwardly depending flange having at least one projection extending laterally through the at least one opening of the chute.

While exemplary embodiments in accordance with the invention are illustrated and disclosed, such disclosure should not be construed to limit the claims. It is anticipated that various modifications and alternative designs may be made without departing from the scope of the invention.

BRIEF DESCRIPTION OF THE DRAWINGS

FIG. 1 is an exploded view of an airbag assembly in accordance with at least one embodiment of the present invention;

FIG. 2 is a side view of components of the airbag assembly illustrated in FIG. 1;

FIG. 3 is a view of a portion of the airbag assembly illustrated in FIG. 2 showing parts in a different position;

FIG. 4 is a perspective view of components of the airbag assembly illustrated in FIGS. 1-3;

FIG. 6 is a side view of the component illustrated in FIG. 5; and

FIG. 7 is a side view of the components illustrated in FIG. 4.

DETAILED DESCRIPTION OF THE PREFERRED EMBODIMENT(S)

Figure 5:
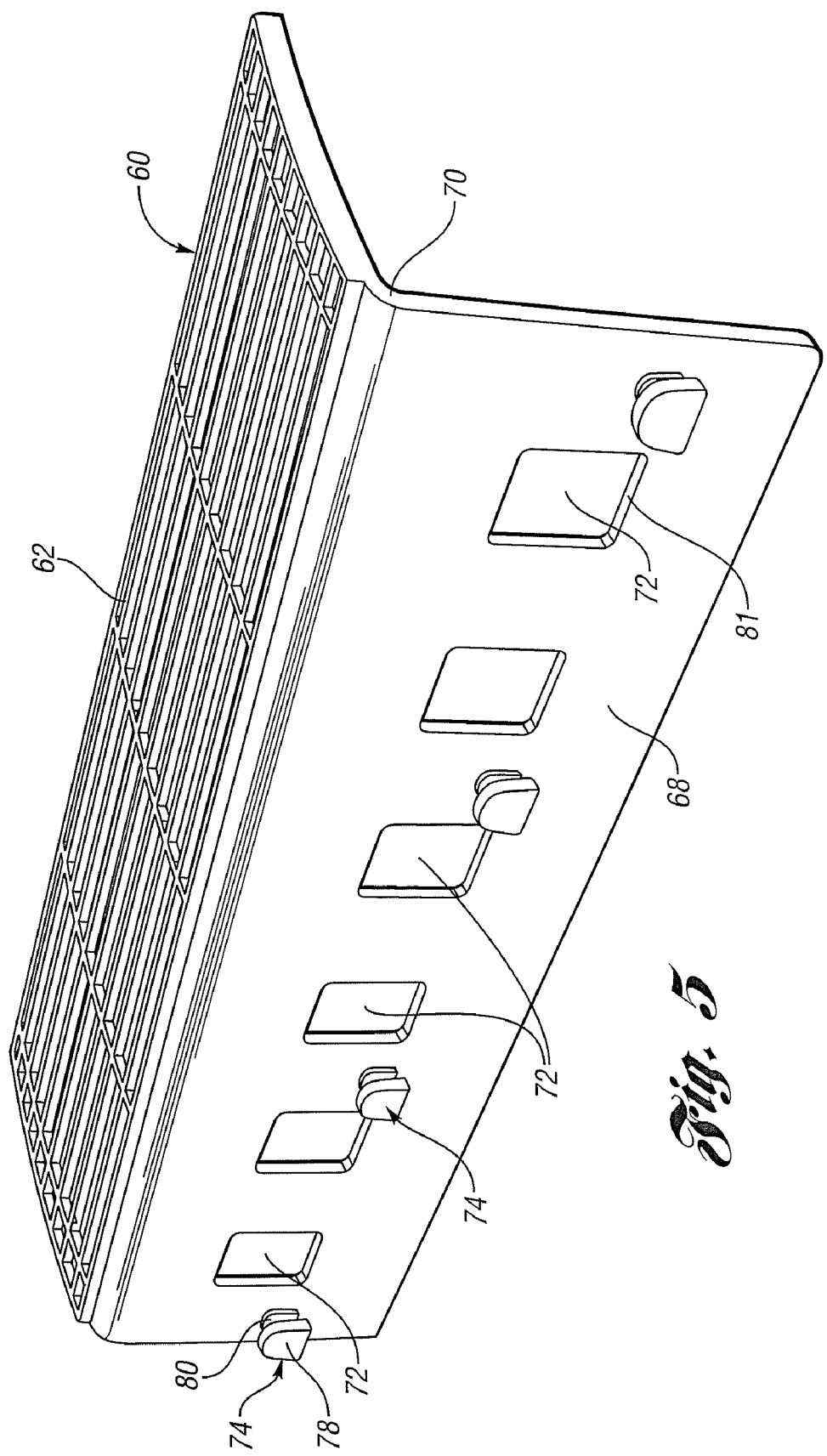
FIG. 5 is a perspective view of a component of the airbag assembly illustrated in FIGS. 1-3.

As required, detailed embodiments of the present invention are disclosed herein. However, it is to be understood that the disclosed embodiments are merely exemplary of the invention that may be embodied in various alternative forms. The Figures are not necessarily to scale, some features may be exaggerated or minimized to show details of particular components. Therefore specific structural and functional details disclosed herein are not to be interpreted as limiting, but merely as a representative basis for the claims and/or a representative basis for teaching one skilled in the art to variously employ the present invention.

Moreover, except where otherwise expressly indicated, all numerical quantities in this description and in the claims indicating amounts of materials or conditions of reaction and/or the use are to be understood as modified by the word "about" in describing the broader scope of this invention. Practice within the numerical limits stated is generally preferred. Also, unless expressly stated to the contrary, the description of a group or class of materials as suitably preferred for a given purpose in connection with the invention implies that mixtures of any two or more members of the group or class may be equally suitable or preferred.

FIG. 1 shows an exploded view of the airbag assembly 10 in accordance with at least one embodiment of the present invention. Referring to FIGS. 1 and 2, the airbag assembly 10 includes an instrument panel 12 that is typically located in front of a windshield (not shown). A portion of the instrument panel 12, illustrated in this embodiment on the passenger side, forms a cover 14 that normally covers and hides an airbag system 16. As should be readily understood, the airbag system 16 can be any type of conventional airbag system having an inflatable airbag 18 for protecting a passenger seated in the passenger compartment. As with other conventional airbag systems 16, the airbag 18 can be inflated by an inflator (not shown) in response to a signal from a controller (now shown) indicating an alert indicative of a collision from a sensing device (not shown), as is well known in the art.

While the passenger compartment is illustrated as being in the front passenger space of the vehicle, it should be understood that the passenger compartment could also be differently located, such as at the driver side or rear passenger space. For instance, the airbag system 16 could alternatively or additionally be a rear and/or side impact airbag system. Moreover, the airbag system 16 could be a driver side system.

The cover 14 illustrated in the Figures comprises a single layer of plastics, such as thermosplastic olefin (TPO). It should be understood however that other types of plastic, such as thermoplastic elastomer (TPE), thermoplastic urethane (TPU), polycarbonate (PC), polypropylene (PP), SMA, acrylonitrile-butadiene-styrene (ABS), and PC/ABS, could also be used. Furthermore, while the cover 14, and thus the instrument panel 12, is illustrated in the Figures as a single layer of plastic, it should be understood that the cover and instrument panel could, in addition to the layer of plastic, include other layers as are known in the art, such as a layer of foam.

Referring to FIG. 1, the cover 14 include a tear seam 20 that, at least in the illustrated embodiment, operates to divide the cover into two door halves 22 and 24. While the tear seam 20 is illustrated in FIG. 1 to have a generally H shape, it should be understood that other configurations of patterns as is known in the art may alternatively be used. Examples of suitable alternative types of patterns include, but are not necessarily limited to, C-, U-, or X-shapes.

The airbag system 16 illustrated in FIG. 1 includes a reaction cannister 28 which houses the airbag 18 (in an undeployed state). The reaction cannister 28 also houses the inflator (not shown) which provide inflation fluid for inflating the airbag 18, when necessary. The reaction cannister 28 illustrated in FIG. 1 is generally rectangular and includes opposed sidewalls 30 with each sidewall having a plurality of hooks 32 extending therefrom. The hooks 32 include a downwardly depending portion 33 having a height H. The reaction cannister 28 illustrated in FIG. 1, further includes end walls 31 extending between and connecting the sidewalls 30.

The airbag assembly 16 further include a door chute assembly 36 and a cooperating door panels assembly 38. The door chute 36 and the door panels assembly 38 can both be made of the same or different suitable plastic materials. Examples of suitable plastic materials include, but are not necessarily limited to, thermoplastic elastomer (TPE), thermoplastic polyurethane (TPU), thermoplastic olefin (TPO), polyvinyl chloride (PVC), and polyolefins, such as PP.

The chute assembly 36 and the door panels assembly 38 are secured to the cover 14 in any suitable manner. For instance, the chute assembly 36 and the door panels assembly 38 can be secured to the cover 14 by vibration welding, bolts, screws, rivets, adhesive and sonic welding. The chute assembly 36 helps to guide deployment of the airbag 18 and reinforce the tear seam 20. The chute assembly 36 also helps, in cooperation with the hooks 32 of the canister 28, to limit the linear movement of the panels 60. The door panel assembly 38 helps to open door halves 22 and 24, keeps the door panels 60 attached to the chute assembly 30 during deployment, and reinforce the tear seam 20.

The chute assembly 36 in the illustrated embodiment include a generally rectangular chute 40 defined by two opposed sidewalls 46 connected by two opposed end walls 48. Each of the sidewalls 46 include spaced apart windows 50. While the windows 50 can have any suitable shape, they are shown in the illustrated embodiments to have generally rectangular shape. In at least one embodiment, the windows 50 are sized to allow hooks 32 to float therein and have a height $H_1$ that is at least as big as, and in other embodiments, greater than the height H of the depending portion 33 of hooks 32. Each of the sidewalls 46 also include spaced apart slots 54. It should be understood that the number and location of the windows 50 and the slots 54 can vary as desired.

In at least the embodiment illustrated in the Figures, as best seen in FIG. 7, the slots 54 each include a shaped window opening 58 towards the bottom of the sidewall 46 and a relatively thin channel 60 extending from the shaped window opening towards the top 59 of the end wall 48. As can best be seen in FIG. 5, the channel 60 terminates in an end point 67. While the shape of the window opening 58 is illustrated to be an arched shape, it should be understood that the shape of the window opening can be any suitable shape, such as rectangular, square and oval, provided the window opening 58 is big enough to enable the projection 74 to fit within.

As can best be seen in FIG. 1, the chute assembly 36 includes a flange 44 extending laterally from the top 59 of the chute 40. In at least the illustrated embodiment, the flange 44 extends away from the chute 40 on all four sides of the chute, however, it should be understood that the flange 44 could extend from less than four sides of the chute. For instance, the flange 44 could extend only away from the top 59 of the sidewalls 46. As can best be seen in FIGS. 1, 2 and 4, in at least the illustrated embodiment, the flange 44 includes laterally extending ribs 45 to help facilitate attachment of the chute assembly 36 to the instrument panel 12. For instance, if the chute 40 is to be vibration welded to the cover 14, the ribs 45 effectively reduce the amount of material required to be welded.

Referring to FIGS. 1 and 2, the door panels assembly 38 include opposed door panels 60 that fit within the chute assembly 36. Each door panel 60 includes a door portion 62. The door portion 62 as can be best seen in the Figures generally extends laterally underneath the cover 14. As can best be seen in FIGS. 1, 2, 4 and 7, each door portion 62 includes laterally extending ribs 63 to help facilitate attachment of the door panels 60 to the cover 14. Each door panel 60 further include a downwardly depending flange 68. Each door panel 60 includes a hinge 70 extending between and connecting the door portion 62 and the downwardly depending flange 68.

As can best be seen by FIGS. 6 and 7, each downwardly depending flange 68 includes spaced apart flange window openings 72 and spaced apart projection 74 extending from the downwardly depending flange 68. It should be understood that the number and location of the window openings 72 and the projections 74 can vary as desired. While the windows openings 72 can have any suitable shape, they are shown in the illustrated embodiments to have generally rectangular shape. While the windows 72 can have any suitable size, in at least one embodiment, they should have a height that is sufficient (i.e., long enough) to enable the hinge 70 of the door panels 62 to extend above the "A" surface of the instrument panel 12 upon deployment.

Each of the projections 74 include a shaped base 78 and an arm 80 that extends between and connect the base 78 with the downwardly depending flange 68. As can be seen in the Figures, the base 78, while generally the same shape as the window opening 58, is smaller in size then the window opening 58 such that the base 78 can be slid through the window opening 58 so the arm 80 can be received within the slot 54. It should be understood however that while being illustrated as being the same general shape as the shape of the window 58, the shape of the base 78 could differ from the shape of the window 58 so long as the base 78 is insertable receivable within the window 58 in a T-slot type of manner. The arm 80 is generally the same thickness as the slot channel 60, such that the arm 80 can be received within the slot and maintain therewith. The arm 80, in at least one embodiment, is the same width W as the thickness of the sidewall 46 of the chute 40.

The hooks 32 from the reaction cannister 28 go through the windows 72 and 50 in the door panels 60 and chute assembly 36, respectively. Upon deployment of the airbag 18, as shown schematically in FIG. 3, the deploying airbag 18 (not shown in FIG. 3) causes movement of the door panels 60 relative to the door chute assembly 36 and the portions of the instrument panel 12 adjacent the cover 14. The deployment of the airbag 18 causes the door panels 60 to move upwardly until the bottom edge 81 of the window 72 contact the hooks 32 of the airbag cannister 28. Essentially, the hooks 32 restrain the upper movement of the panels 60 caused by inflation of the airbag 18 as the bottom surfaces of the windows 72 engage the hooks 32. At this point, the hinges 70 of the door panels 60 are above the portion of the instrument panel 12 adjacent the cover 14 such that the door portions 62 of the door panel 60 are above the show surface (i.e., the outer or "A" surface) of the instrument panel 12 before the airbag doors 22 and 24, respectively, and the door portions 62 of the panels 60 pivot to provide an opening for the airbag 18 to extend there through.

While deployment of the airbag 18 is taking place, the projections 74 slide up within the channels 60 of the slots 54. The projection 74 also add a secondary retention system for the door panels 60 as the projection engage the top 67 of the slot 54. Moreover, the projections 74 and the slots 54 also cooperate to hold the door panel 60 to the chute assembly 36 as an assembly aid for securing the chute assembly 36 and door panels 60 to the instrument panel 12. The projections 74 also cooperate with the slots 54 to increase the hooks 32 ability to remain engaged to the chute assembly 36 and door panels assembly 38 during deployment.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. An airbag assembly comprising;
    a panel having a tear seam forming at least one airbag door;
    a door chute assembly comprising a laterally extending flange connected to the panel proximate the at least one airbag door, the door chute assembly including a chute depending from the flange away from the panel, the chute having at least one opening comprising a window portion communicating with a channel portion, the channel portion having a first general width and the window portion having a second general width, greater than the first general width;
    a door panel assembly including at least one door panel disposed within the chute and connected to the at least one airbag door, the at least one door panel having a downwardly depending flange having at least one projection extending laterally through the at least one opening of the chute; and
    an airbag cannister assembly comprising an inflatable airbag mounted on the door chute assembly, wherein the at least one projection includes a base spaced apart from the downwardly depending flange and an arm extending between and connecting the base and the downwardly depending flange, the arm having a third general width which is roughly the same as the first general width, the window portion having a first shape and the base having the first shape and a fourth general width, the fourth general width being smaller than the second general width and greater than the first general width.

2. The airbag assembly of claim 1 wherein the chute of the door chute assembly comprises a rectangular wall.

3. The airbag assembly of claim 1 wherein the at least one projection comprises a plurality of spaced apart projections.

4. The airbag apparatus of claim 3 wherein the at least one opening comprises a plurality of spaced apart openings disposed on the chute, wherein each of the projections extends through a respective one of the openings.

5. The airbag assembly of claim 1 wherein the at least one projection cooperates with the at least one opening to inhibit the distance the at least one door panel can linearly travel during deployment of the airbag.

6. The airbag assembly of claim 5 wherein the distance the panel is allowed to travel is sufficient to enable a portion of the downwardly depending flange to extend above the panel.

7. The airbag assembly of claim 1 wherein the at least one projection cooperates with at least one the opening to maintain the door chute assembly and the at least one door panel assembly in a relative fixed arrangement while the door chute assembly and the door panel are being connected to the panel.

8. A door chute and panel assembly for use with an airbag assembly comprising a panel having a tear seam forming at least one airbag door, and an air bag cannister assembly comprising an inflatable airbag, the door chute and panel assembly comprising:
    a door chute assembly comprising a laterally extending flange connectable to the panel proximate the at least one airbag door, the door chute assembly including a chute depending from the flange, the chute including a depending wall having an inner surface and an outer surface, the chute having at least one opening extending through the depending wall between the inner and outer surfaces; and
    a door panel assembly including at least one door panel disposed within the chute and connectable to the at least one airbag door, the at least one door panel having a downwardly depending flange having at least one projection extending laterally through the at least one opening of the chute, the at least one opening comprising a window portion communicating with a channel portion, the channel portion having a first general width and window portion having a second general width, greater than the first general width, wherein the at least one projection includes a base spaced apart from the downwardly depending flange and an arm extending between and connecting the base and the downwardly depending flange, the arm having a third general width which is roughly the same as the first general width, the window portion having a first shape and the base having the first shape and a fourth general width, the fourth general width being smaller than the second general width and greater than the first general width.

9. The assembly of claim 8 wherein the at least one projection comprises a plurality of spaced apart projections.

10. The assembly of claim 9 wherein the at least one opening comprises a plurality of spaced apart openings disposed on the chute, wherein each of the projections extends through a respective one of the openings.

11. The assembly of claim 10 wherein the at least one projection cooperates with the at least one opening to inhibit the distance the at least one door panel can linearly travel during deployment of the airbag.

12. The assembly of claim 11 wherein the distance the panel is allowed to travel is sufficient to enable a portion of the downwardly depending flange to extend above the panel.

13. A method for manufacturing an airbag assembly, the method comprising:
    providing a panel having a tear seam forming at least one airbag door;
    providing a door chute assembly comprising a chute having a laterally extending flange and at least one opening comprising a window portion communicating with a channel portion, the channel portion having a first general width and the window portion having a second general width, greater than the first general width;

connecting the flange of the door chute assembly to the panel proximate the at least one airbag door; and disposing a door panel assembly including at least one door panel disposed within the chute and connecting the at least one door panel to the at least one airbag door, the at least one door panel having a downwardly depending flange having at least one projection extending laterally through the at least one opening of the chute assembly, wherein the at least one projection includes a base spaced apart from the downwardly depending flange and an arm extending between and connecting the base and the downwardly depending flange, the arm having a third general width which is roughly the same as the first general width, the window portion having a first shape and the base having the first shape and a fourth general width, the fourth general width being smaller than the second general width and greater than the first general width.

14. A door chute and panel assembly for use with an airbag assembly comprising a panel having a tear seam forming at least one airbag door, and an air bag cannister assembly comprising an inflatable airbag, the door chute and panel assembly comprising:

a door chute assembly comprising a laterally extending flange connectable to the panel proximate the at least one airbag door, the door chute assembly including a chute depending from the flange, the chute having at least one opening comprising a window portion communicating with a channel portion, the channel portion having a first general width and window portion having a second general width, greater than the first general width; and a door panel assembly including at least one door panel disposed within the chute and connectable to the at least one airbag door, the at least one door panel having a downwardly depending flange having at least one projection extending laterally through the at least one opening of the chute assembly, wherein the at least one projection includes a base spaced apart from the downwardly depending flange and an arm extending between and connecting the base and the downwardly depending flange, the arm having a third general width which is roughly the same as the first general width, the window portion having a first shape and the base having the first shape and a fourth general width, the fourth general width being smaller than the second general width and greater than the first general width.

* * * * *

UNITED STATES PATENT AND TRADEMARK OFFICE
CERTIFICATE OF CORRECTION

| | | |
|---|---|---|
| PATENT NO. | : 7,806,430 B2 | Page 1 of 1 |
| APPLICATION NO. | : 11/457253 | |
| DATED | : October 5, 2010 | |
| INVENTOR(S) | : Glenn A. Cowelchuk et al. | |

It is certified that error appears in the above-identified patent and that said Letters Patent is hereby corrected as shown below:

Column 6, Line 11, Claim 7:

Delete "with at least one the opening" and

Insert -- with the at least one opening --.

Column 6, Line 13, Claim 7:

After "door panel" delete "assembly".

Signed and Sealed this

Twenty-first Day of December, 2010

David J. Kappos
*Director of the United States Patent and Trademark Office*